United States Patent [19]

Matsumoto

[11] Patent Number: 4,727,954
[45] Date of Patent: Mar. 1, 1988

[54] POWER TRANSMITTING SYSTEM FOR A FOUR-WHEEL DRIVE VEHICLE
[75] Inventor: Rempei Matsumoto, Oota, Japan
[73] Assignee: Fuji Jukogyo Kabushiki Kaisha, Tokyo, Japan
[21] Appl. No.: 18,456
[22] Filed: Feb. 25, 1987
[30] Foreign Application Priority Data Feb. 28, 1986 [JP] Japan ................................. 61-43600
Feb. 28, 1986 [JP] Japan ................................. 61-43601
Jul. 18, 1986 [JP] Japan ................................ 61-169271

[51] Int. Cl.$^4$ ........................................... B60K 17/34
[52] U.S. Cl. ................................................ 180/249
[58] Field of Search ............... 180/249, 250, 248, 247, 180/233

[56] References Cited
U.S. PATENT DOCUMENTS 4,618,022 10/1986 Hayashi et al. ..................... 180/249
4,644,822 2/1987 Batchelor ............................ 180/250

Primary Examiner—John A. Pekar
Attorney, Agent, or Firm—Martin A. Farber

[57] ABSTRACT

A pair of planetary gear devices are provided in a power transmitting system. One of the members of one of the planetary gear devices is operatively connected to a front drive shaft and another member of the other planetary gear device is operatively connected to a rear drive shaft. A pair of clutches are provided to separately lock the planetary gear devices.

10 Claims, 7 Drawing Figures

POWER TRANSMITTING SYSTEM FOR A FOUR-WHEEL DRIVE VEHICLE

BACKGROUND OF THE INVENTION

The present invention relates to a system for transmitting the power of an engine to four wheels of a four-wheel drive vehicle.

In a conventional four-wheel drive vehicle having a central differential, which is called a full time four-wheel drive vehicle, the central differential operates to uniformly distribute the torque of an engine to the front wheels and to rear wheels.

It is known that the distribution ratio of torque has influence on driveability, steerability, stability, starting characteristic and others. Namely, when the distribution to the front wheel is increased, a stable cornering characteristic at high vehicle speed is established, and when distribution to the rear wheels is increased, steerability at low vehicle speed is improved. In the conventional four-wheel drive vehicle, the distribution ratio of torque for front wheels to rear wheels can not be changed.

SUMMARY OF THE INVENTION

The object of the present invention is to provide a system which may change the distribution ratio of torque to front wheels and rear wheels in accordance with driving conditions of a four-wheel drive vehicle.

According to the present invention, there is provided a power transmitting system for a four-wheel drive vehicle comprising first and second plantetary gear devices for transmitting power of an engine to front and rear wheels, first and second torque distribution devices each of which including clutch means provided for rendering the corresponding planetary gear device inoperative and for changing torque transmitted to the front and rear wheels and a control device for rendering the clutch means operative.

In an aspect of the invention, the clutch means is a fluid operated multiple-disk type clutch, and the clutch is provided to lock two members of the corresponding planetary gear device with each other.

The other objects and features of this invention will become understood from the following description with reference to the accompanying drawings.

DETAILED DESCRIPTION OF THE PREFERRED EMBODIMENTS

Figure 1:
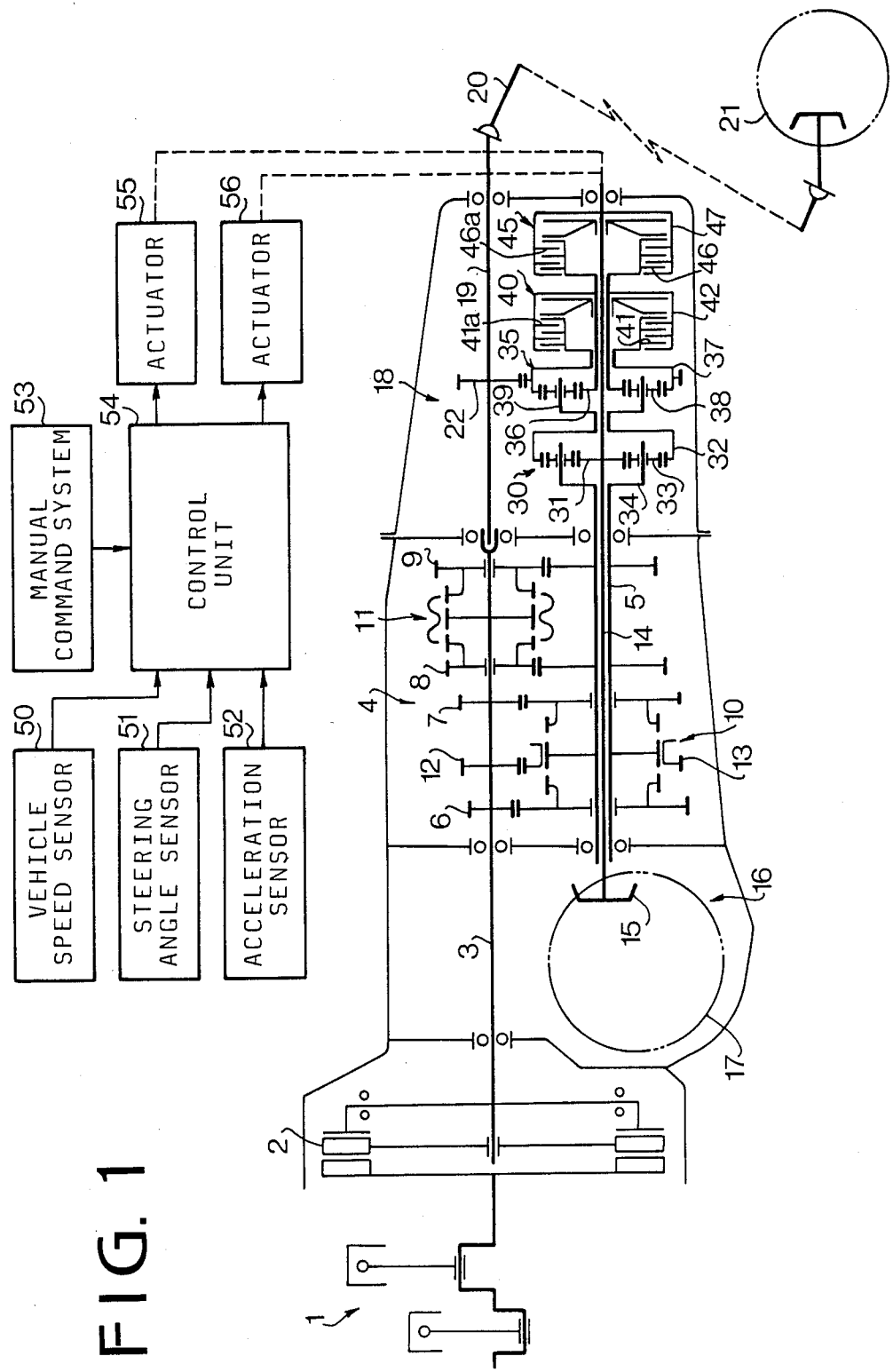
FIG. 1 is a schematic diagram of a four-wheel drive power transmission system in a first embodiment of the present invention.

FIG. 1 shows a power transmission system for a four-wheel drive motor vehicle to which the present invention is applied. An engine 1 is longitudinally mounted on the motor vehicle at a front portion thereof, thus forming a transaxle type. The power transmission system housed in a transmission case comprises a clutch 2, transmission 4 and transfer device 18. The transmission 4 has an input shaft 3, a tubular output shaft 5 parallel with the input shaft 3, four pairs of change-speed gears 6 to 9 corresponding to first to fourth speed gears, and synchronizers 10 and 11. The synchronizers 10 and 11 are disposed between the gears 6 and 7 and between the gears 8 and 9, respectively. A reverse drive gear 12 mounted on the input shaft 3 meshes with a gear 13 formed on one side of a sleeve of the synchronizer 10 through an idler gear (not shown) for reverse drive.

A front drive shaft 14 is rotatably supported in the output shaft 5 and by a bearing. A drive pinion 15 at the front end of the shaft 14 meshes with a crown gear 17 of a front differential 16 so as to transmit the power to the front wheels (not shown) of the vehicle.

In the transfer device 18 disposed behind the transmission, a rear drive shaft 19 is disposed in parallel with the front drive shaft 14. The rear drive shaft 19 is connected to the rear wheels (not shown) of the vehicle through a propeller shaft 20 and a rear differential 21. The shaft 19 is supported by bearings.

The transfer device 18 has first and second planetary gear devices 30, 35 disposed in series on the front drive shaft 14 to serve as a central differential. The planetary gear device 30 comprises a sun gear 31, a ring gear 32 having internal teeth, planet pinions 33 in mesh with both gear 31 and the internal teeth of ring gear 32, and a carrier 34 supporting the pinions 33. The carrier 34 is connected with the output shaft 5 and the sun gear 31 is coupled to the front drive shaft 14. The second planetary gear device 35 comprises a sun gear 36, a ring gear 37 having internal and external teeth, planet pinions 38 and a carrier 39 connected with the ring gear 32 of the first planetary gear device 30. The external teeth of the ring gear 37 are engaged with a gear 22 fixedly mounted on the rear drive shaft 19.

In order to control the distribution of torque to the front and rear wheels, or to lock the differential mechanism of the planetary gear devices, first and second fluid operated multiple-disk friction clutches 40 and 45 are provided. The first clutch 40 has inner disks 41 connected to the ring gear 37 of the second planetary gear device 35 and outer disks 41a secured to a drum 42. The drum 42 is connected with the sun gear 36 and with inner disks 46 of the second clutch 45. A drum 47 of the second clutch 45 having outer disks 46a is secured to the front drive shaft 14.

The system for controlling the torque distribution comprises a vehicle speed sensor 50, steering angle sensor 51, acceleration sensor 52 and manual command system 53, each electrically connected with a control unit 54. The manual command system 53 is actuated when the vehicle is driven on rough road, for example a muddy road, or when the vehicle is stuck. Actuators 55, 56 are provided to supply oil to the clutches 40 and 45. The control unit 54 selects an appropriate torque distribution ratio according to driving conditions. The output signals of the control unit 54 are supplied to the actuators 55,56 so as to control the oil pressure in the clutches 40 and 45.

The power of the engine 1 is transmitted to the transmission 4 through the clutch 2 and the input shaft 3 and further to the carrier 34 of the first planetary gear device 30 in the transfer device 18. The torque is transmitted to the front wheels through sun gear 31, front drive shaft 14 and front differential 16, and to the carrier 39 of the second planetary gear device 35.

When the vehicle is driven at low or middle speed, which is the most common driving condition, the control unit 54 produces signals so as to apply maximum oil pressure to the first clutch 40 and none to the second clutch 45. Accordingly, the sun gear 36 and the ring gear 37 are coupled with each other. Therefore, the torque of the ring gear 32 is transmitted to the rear wheels through the carrier 39, pinions 38, ring gear 37, gear 22, rear drive shaft 19, propeller shaft 20 and rear differential 21. The difference between the speed of the front and rear wheels is absorbed as the planet pinions 33 walk around the sun gear and on the ring gear 32. Thus, the planetary gear device 30 operates as a central differential. Accordingly, a full time four-wheel driving mode with the central differential function is established. Since the torque is transmitted to the front and rear wheels through the sun gear 31 and the ring gear 32, respectively, the torque is distributed in accordance with the difference between the gear ratios of the sun gear 31 and the ring gear 32 (the diameter of the ring gear is larger than that of the sun gear). Therefore, the torque $T_F$ of the front wheels is smaller than the torque $T_R$ of the rear wheels ($T_F < T_R$) thereby improving cornering power of the vehicle.

Figure 2A:
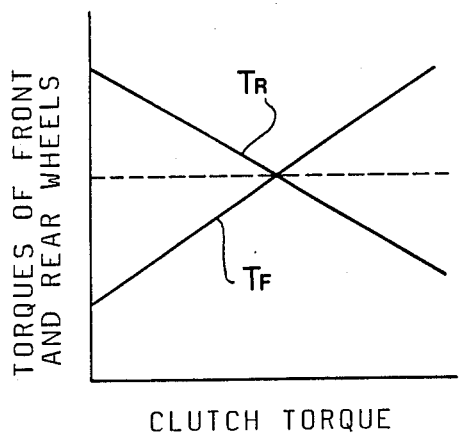
FIGS. 2a to 2d are graphs showing relationships among oil pressure, clutch torque and front and rear wheel torque.
Figure 2B:
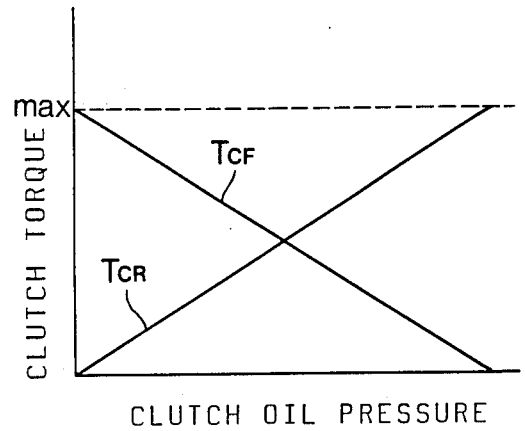

When the oil pressure in the first clutch 40 is decreased and at the same time the oil pressure in the second clutch 45 is increased as shown in FIG. 2b, the torque $T_{CF}$ of the first clutch 40 is decreased and the torque $T_{CR}$ of the second clutch 45 is increased. Since the torque is additionally transmitted to the front drive shaft 14 through the drum 47 of the clutch 45, the front torque $T_F$ is increased. Consequently, the rear torque $T_R$ is reduced as shown in FIG. 2a.

When the vehicle is driven at a high speed, the control unit 54 produces signals so as to apply maximum pressure to the second clutch 45 and none to the first clutch 40. Accordingly, the clutch 45 is engaged thereby connecting the sun gear 36 of the second planetary gear device 35 to the front drive shaft 14. Therefore, torque is transmitted to the front drive shaft 14 through the sun gear 31 of the first planetary gear device 30 and also through the sun gear 36 of the second planetary gear device 35 and the clutch 45. Since the first clutch 40 is disengaged, torque is transmitted to the rear drive shaft 19 only through the ring gear 37 of the second planetary gear device 35 and gear 22. Thus, the front torque $T_F$ is larger than the rear torque $T_R$ ($T_F > T_R$) providing a stable driving. The difference of speed between the front and rear wheels is absorbed as the pinions 33 and 38 walk around the sun gears and ring gears while the ring gears and carriers rotate.

Figure 2C:
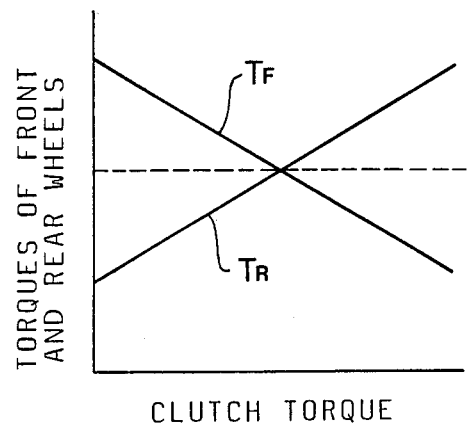
Figure 2D:
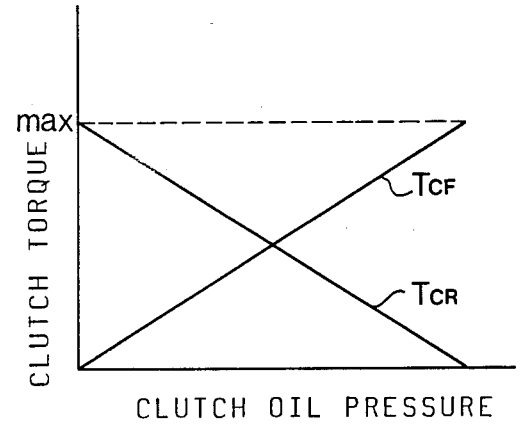

When oil pressure in the clutch 45 is decreased and oil pressure in the clutch 40 is increased, clutch torque $T_{CF}$ of the first clutch 40 is increased and the clutch torque $T_{CR}$ of the second clutch 45 is decreased as shown in FIG. 2d. Thus, torque distribution can be linearly varied as shown in FIG. 2c.

When the vehicle is driven on a rough road, the control unit 54 produces lock signals so that the oil pressure in the clutches 40 and 45 becomes maximum. Accordingly, the clutches operate to couple the sun gear 31 with the ring gear 32. Therefore, the front and rear drive shafts are directly connected so that the torque $T_F$ substantially equals the torque $T_R$ ($T_F \approx T_R$).

The conditions of clutches for the aforementioned torque distributions are shown in the following table.

TABLE I

| Driving Condition | First Clutch 40 | Second Clutch 45 | Torque Distribution |
| --- | --- | --- | --- |
| Low or Middle Speed | Engage | Disengage | $T_F < T_R$ |
| Rough Road | Engage | Engage | $T_F \approx T_R$ |
| High Speed | Disengage | Engage | $T_F > T_R$ |

The planetary gear devices employed in the present embodiment may be replaced by bevel gear systems.

Figure 3:
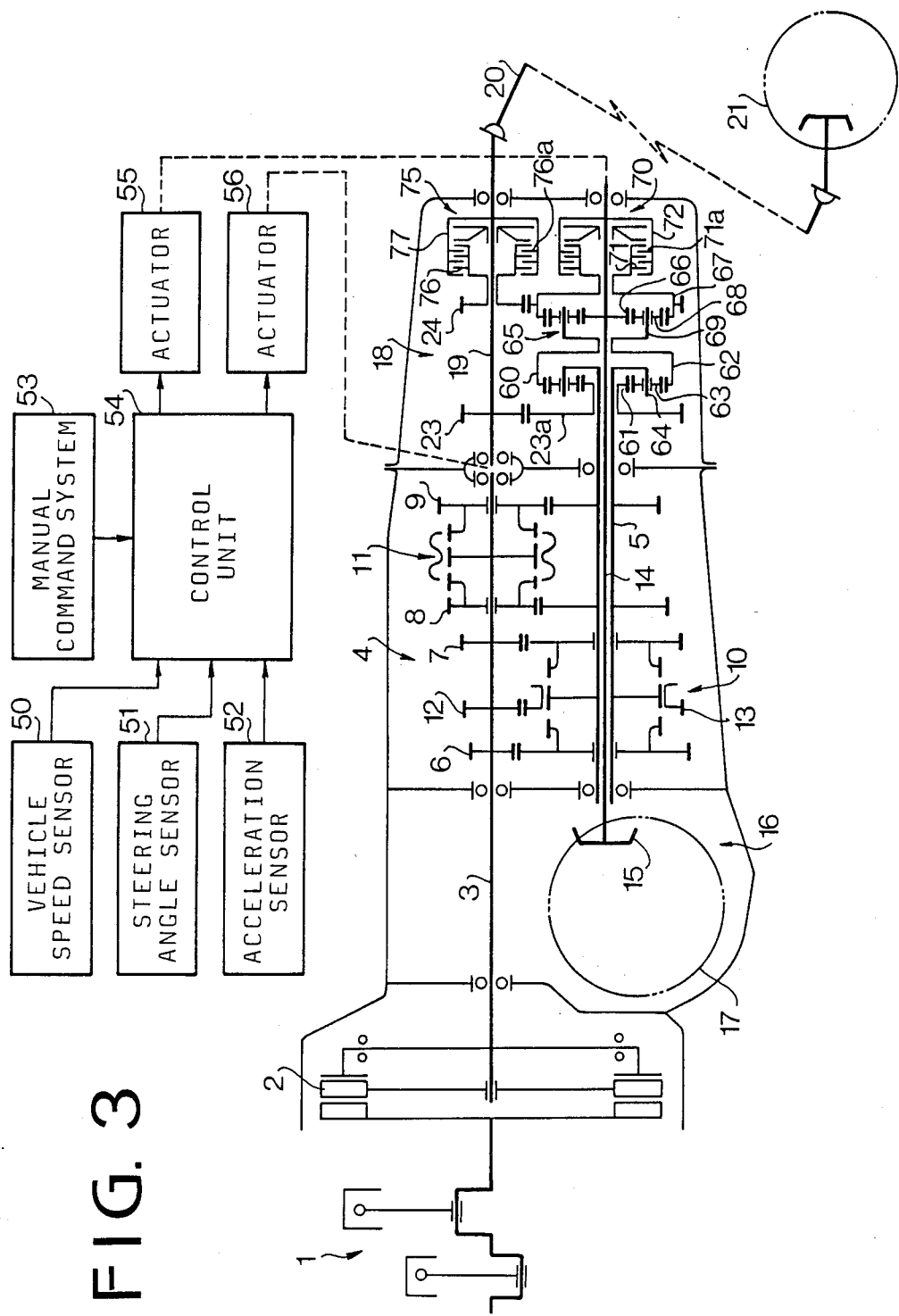
FIGS. 3 and 4 show schematic diagrams of four-wheel drive power transmission systems in second and third embodiments of the present invention, respectively.

FIG. 3 shows the second embodiment of the present invention. The construction of the power transmission system is the same as the first embodiment but for the arrangement of planetary gear devices and clutches in the transfer device 18.

A first planetary gear device 60 and a second planetary gear device 65 which serve as a central differential are mounted on the front drive shaft 14. The first planetary gear device 60 has a sun gear 61, a ring gear 62, planet pinions 63 and a carrier 64 connected to the output shaft 5 of the transmission 4. The sun gear 63 is connected to a gear 23a which is in mesh with a gear 23 securely mounted on the rear drive shaft 19. The ring gear 62 is connected to a carrier 69 of the second planetary gear device 65 which comprises a sun gear 66 fixedly mounted on the front drive shaft 14, a ring gear 67 having external teeth, and planet pinions 68. The external teeth of the ring gear 67 meshes with a gear 24 which is rotatably mounted on the rear drive shaft 19.

First and second clutches 70 and 75 are provided on the front drive shaft 14 and rear drive shaft 19, respectively. Inner disks 71 of the first clutch 70 are connected with the ring gear 67 of the second planetary gear device 65, and a drum 72 having outer disks 71a is secured to the front drive shaft 14. Inner disks 76 of the second clutch 75 are connected to the gear 24 and a drum 77 having outer disks 76a is secured to the rear drive shaft 19. The clutches 70 and 75 are applied with oil pressure from the actuators 56 and 55, respectively.

When the vehicle is in a high speed drive range, the control unit 54 produces a signal to apply maximum oil pressure to the first clutch 70. The oil pressure applied to the second clutch 75 is zero. Accordingly, the clutch 70 is engaged to couple the sun gear 66 and the ring gear 67 of the second planetary gear device 65. Therefore, torque of the output shaft 5 is transmitted to the front drive shaft 14 through the carrier 64, planet pinions 63, ring gear 62, carrier 69, ring gear 67 and the clutch 70. The torque is transmitted to the rear drive shaft 19 through sun gear 61 and gears 23a, 23. Since the second clutch 75 is disengaged, the gear 24 is idly rotated without transmitting the torque to the rear drive shaft 19. Accordingly, the distribution ratio between the front torque $T_F$ and the rear torque depends on the gear ratio between the large ring gear 62 and the small sun gear 61. Therefore, the front torque $T_F$ is larger than the rear torque $T_R$ ($T_F > T_R$) as shown in FIG. 2c.

When the vehicle is in low or middle speed range, the control unit 54 applies signals to the actuator 55 to engage the second clutch 75 and to the actuator 56 to disengage the first clutch 70. Thus, the gear 24 is coupled to the rear drive shaft 19. Consequently, the torque is transmitted to the rear drive shaft 19 through the ring gear 67 of the second planetary gear device 65 and the gear 24 as well as through the sun gear 63 and gears 23a and 23. Since the torque is transmitted to the front drive shaft 14 only through the sun gear 66, the front torque $T_F$ is smaller than the rear torque $T_R$ ($T_F < T_R$).

When the vehicle is driven on rough roads, both clutches 70 and 75 are applied with oil pressure to be engaged. Accordingly, the sun gear 66 and the ring gear 67 are coupled so that the front drive shaft 14 and the rear drive shaft 19 are directly connected. Therefore, the front torque $T_F$ and the rear torque $T_R$ becomes substantially the same ($T_F \approx T_R$).

The conditions of clutches for each torque distribution are shown in the Table II.

TABLE II

| Driving Condition | First Clutch 70 | Second Clutch 75 | Torque Distribution |
|---|---|---|---|
| Low or Middle Speed | Disengage | Engage | $T_F > T_R$ |
| Rough Road | Engage | Engage | $T_F \approx T_R$ |
| High Speed | Engage | Disengage | $T_F < T_R$ |

The torque distribution can be varied by increasing oil pressure of one of the clutches and decreasing the other.

Figure 4:
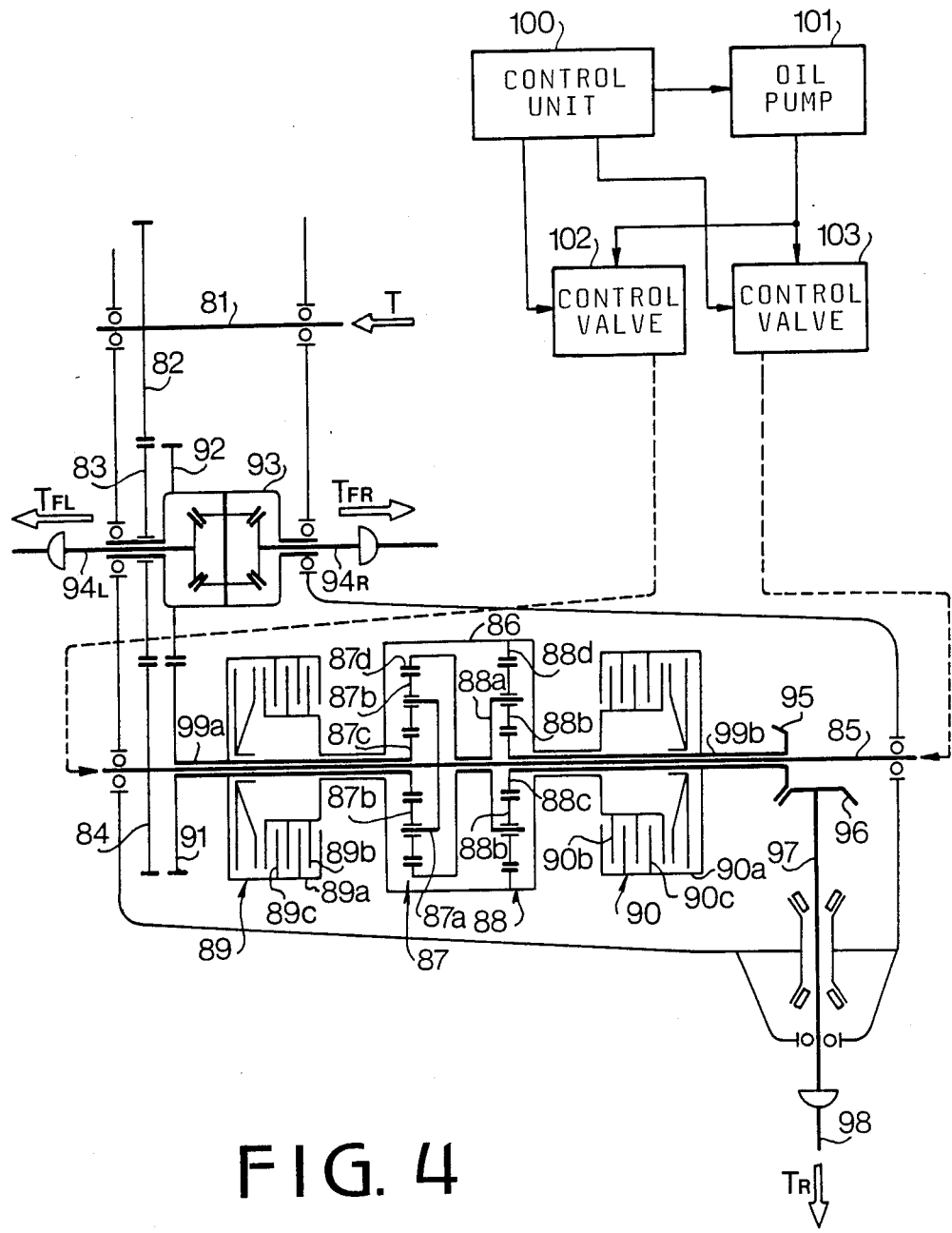

Referring to FIG. 4, the third embodiment of the present invention is applied to a motor vehicle having a laterally mounted engine. An input shaft 81 through which torque T of a transmission is transmitted is provided with a gear 82 securely mounted thereon. The gear 82 is in mesh with a gear 83 which in turn meshes with a gear 84 fixedly mounted on a transfer shaft 85 supported in a transmission case by bearings. First and second planetary gear devices 87 and 88 are mounted on the transfer shaft 85 and housed in a housing 86. The first planetary gear device 87 comprises a carrier 87a fixedly mounted on the transfer shaft 85, planet pinions 87b, a sun gear 87c secured to a shaft 99a, and a ring gear 87d. The second planetary gear device 88 comprises a carrier 88a connected to the ring gear 87d, planet pinions 88b, a sun gear 88c secured to a shaft 99b and a ring gear 88d which is integral with the housing 86.

A first clutch 89, which is a fluid operated multiple-disk friction clutch, has inner disks 89b connected to the housing 86 and outer disks 89c secured to a drum 89a which is securely mounted on the shaft 99a. A gear 91 secured to the shaft 99a meshes with a gear 92 secured to a case of a front differential 93. The front differential 93 has front axles 94R, 94L for transmitting front torque $T_F$ to right and left front wheels ($T_{FL} + T_{FR} = T_F$).

The housing 86 is connected to inner disks 90b of a second clutch 90, which is also a fluid operated multiple-disk friction clutch. A drum 90a of the clutch 90 having outer disks 90c is secured to the shaft 99b provided with a bevel gear 95. The bevel gear 95 meshes with a bevel gear 96 formed on a rear drive shaft 97 which is connected with a propeller shaft 98 for transmitting rear torque $T_R$ to the rear wheels.

Control valves 102, 103 are provided to control the pressure of oil supplied by an oil pum 101 in accordance with signals from a control unit 100. The control unit 100 comprises a microcomputer applied with signals from sensors such as vehicle speed sensor, steering angle sensor, acceleration sensor and road sensor.

When the control unit 100 produces a signal for opening the control valve 102 and a signal for closing the control valve 103, the clutch 89 is engaged. The torque T of the input shaft 81 from the transmission is transmitted to the transfer shaft 85 through gears 82, 83, 84. The torque T is further transmitted to the front axles 94R and 94L through the carrier 87a, planet pinions 87b, sun gear 87c of the first planet gear device 87, shaft 99a, gears 91, 92 and front differential 93.

On the other hand, torque is transmitted to the rear drive shaft 97 through the carrier 87a, planet pinions 87b, ring gear 87d, carrier 88a, pinions 88b, sun gear 88c, shaft 99b and bevel gears 95, 96. Since the torque transmitted to the ring gear 88d is further transmitted to the inner disks 89b of the clutch 89 through the housing 86, the front torque $T_F$ becomes larger than the rear torque $T_R$ ($T_F > T_R$). Thus, the torque distribution is appropriate for driving at high speed.

While the vehicle is driven on rough roads, control unit 100 applies signals to open both control valves 102 and 103 so that both clutches 89 and 90 are engaged. Thus, the front drive shafts 94R, 94L and the rear drive shaft 97 are connected through clutch 89, housing 86 and clutch 90. Accordingly, the front torque $T_F$ and the rear torque $T_R$ are substantially equal.

When the control unit 100 applies a signal to only open the control valve 103 to engage the second clutch 90, the sun gear 88c and the ring gear 88d are locked together. The front torque $T_F$ is transmitted to the front drive shafts through the sun gear 87c. The rear torque $T_R$ is transmitted to the rear drive shaft 97 through the ring gear 87d, carrier 88a, pinions 88b, ring gear 88d, clutch 90, shaft 99b and bevel gears 95, 96. The torque distribution is decided by the gear ratio of the sun gear 87c and the ring gear 87d. Thus, the front torque $T_F$ is smaller than the rear torque $T_R$ ($T_F < T_R$). The conditions of clutches for each torque distribution are the same as those shown in the Table II.

One of the clutches may be provided with a spring so as to normally engage inner and outer disks thereof and to disengage when the oil pressure is applied. Thus, the distribution of torque can be kept at a ratio for the most common driving condition, for example, low or middle speed range, without applying any oil pressure. Therefore, ordinary driving is not affected even though the control system should fail.

The fluid-operated multiple-disk friction clutch employed in the aforementioned embodiments may be replaced by other clutches, such as an electromagnetic clutch. The oil pump may be substituted by a pneumatic pump.

In accordance with the present invention, there is provided a torque distribution system wherein the distribution ratio of the torque to the front and the rear wheels can be changed in accordance with the driving conditions or at the preference of the driver. Since a friction clutch is employed instead of a dog clutch, irregular or retarded operation is prevented. In addition, loss of torque is reduced.

While the presently preferred embodiments of the present invention have been shown and described, it is to be understood that this disclosure is for the purpose of illustration and that various changes and modifications may be made without departing from the spirit and scope of the invention as set forth in the appended claims.

What is claimed is:

1. A power transmitting system for a four-wheel drive vehicle having first and second drive wheels and having a transmission, the latter having an output member, the system comprising first and second differential gear devices, each of said gear devices having an input member and two output members;

the input member of the first differential gear device being operatively connected to the output member of the transmission, the imput member of the second differential gear device being connected to one of the output members of the first differential gear device, first and second clutch means, each of said clutch means being capable of continuously changing its transmitting torque, said first clutch means being arranged so as to engage said output members of the second differential gear device with each other, means for operatively connecting one of the output members of the first differential gear device to the first drive wheels, and means for operatively connecting one of the output members of the second differential gear device to the second drive wheels, the second clutch means being arranged so as to transmit a part of the output of the second differential gear device to the first drive wheels of the vehicle, whereby torque distribution to the drive wheels is continuously changeable.

2. The system according to claim 1 wherein the clutch means are a fluid operated multiple-disk clutch.

3. The system according to claim 2, wherein
said clutch is a friction clutch.

4. The system according to claim 1, wherein
said differential gear devices are planetary gear devices.

5. The system according to claim 4, wherein
said input member is a carrier and said output members are a sun gear and a ring gear.

6. The system according to claim 1, wherein
said differential gear devices are bevel gear systems.

7. The system according to claim 1, wherein
said clutch means comprise electromagnetic clutches.

8. A power transmitting system for a four-wheel drive vehicle having first and second drive wheels and having a transmission, the latter having an output member, the system comprising first and second differential devices, each of said devices having an input member and two output members, the input member of the first differential device being operatively connected to the output member of the transmission, the input member of the second differential device being connected to one of the output members of the first differential device, first and second clutch means, each of said clutch means being capable of continuously changing its transmitting torque, said first clutch means being arranged so as to engage said output members of the second differential device with each other, means for operatively connecting the other one of the output members of the first differential device to the first drive wheels, said second clutch means being arranged so as to engage one of said output members of the second differential device with said other output member of the first differential device, and means for operatively connecting the other one of the output members of the second differential device to the second drive wheels.

9. A power transmitting system for a four-wheel drive vehicle having first and second drive wheels and having a transmission, the latter having an output member, the system comprising a first differential means connected to said output member for dividing torque from the output member of the transmission into a first torque portion and a second torque portion, a second differential means connected to said first differential means for dividing said second torque portion into a third torque portion and a fourth torque portion, means connected to the first differential means and said first drive wheels for transmitting said first torque portion to said first drive wheels, means connected to the second differential means and said second drive wheels for transmitting said fourth torque portion to said second drive wheels, clutch means for continuously changing its transmitting torque, said clutch means being operatively connected to said second differential means and to said first and second drive wheels for selectively transmitting said third torque portion to said first and second drive wheels in continuous distribution ratios.

10. The system according to claim 9, wherein
said clutch means comprises first and second clutch means, each of said first and second clutch means being capable of continuously changing its transmitting torque, said first and second clutch means both being operatively connected to said second differential means, and said first and second clutch means being operatively connected to said first and second drive wheels, respectively, for selectively transmitting said third torque portion to said first and second drive wheels in continuous distribution ratios.

* * * * *